United States Patent [19]

Hirai

[11] 4,291,330

[45] Sep. 22, 1981

[54] VIDEO SIGNAL PROCESSING CIRCUIT FOR ELIMINATING AN INTERFERING SIGNAL

[75] Inventor: Jun Hirai, Tokyo, Japan

[73] Assignee: Sony Corporation, Tokyo, Japan

[21] Appl. No.: 32,926

[22] Filed: Apr. 24, 1979

[30] Foreign Application Priority Data

Apr. 28, 1978 [JP] Japan .................................. 53-51819

[51] Int. Cl.³ ...................... H04N 5/21; H04N 5/785
[52] U.S. Cl. .......................................... 358/8; 358/36; 358/39
[58] Field of Search ..................... 358/8, 21 R, 31, 36, 358/39, 167, 37, 38; 360/30, 38

[56] References Cited

U.S. PATENT DOCUMENTS

| | | | |
|---|---|---|---|
| 3,872,498 | 3/1975 | Pritchard | 358/21 |
| 4,003,079 | 1/1977 | Woo | 358/31 |
| 4,012,774 | 3/1977 | Kuniyoshi et al. | 358/8 |
| 4,052,740 | 10/1977 | Coleman, Jr. | 358/8 X |
| 4,074,321 | 2/1978 | Miller | 358/31 |
| 4,093,959 | 6/1978 | Hedlund | 358/8 X |
| 4,143,396 | 3/1979 | MacKenzie | 358/8 |
| 4,167,749 | 9/1979 | Burrus | 358/8 |

*Primary Examiner*—James W. Moffitt
*Assistant Examiner*—Donald McElheny, Jr.
*Attorney, Agent, or Firm*—Lewis H. Eslinger; Alvin Sinderbrand

[57] ABSTRACT

A video signal processing circuit eliminates an interfering signal that is included in a video signal, and is especially effective for eliminating an intefering signal that results from reproducing a video signal that is recorded in successive slant tracks on a recording medium, such as magnetic tape. In the video signal processing circuit, a delay line delays at least the luminance component of the video signal by a predetermined number of horizontal line intervals, a first subtracting circuit combines the delayed luminance component with the undelayed luminance component to produce a first difference signal, a limter limits the first difference signal and presents the limited first difference signal to a second subtracting circuit, where the latter signal is subtractively combined with the delayed luminance signal to produce an output signal free of interfering signals. In order to improve the performance of the processing circuit, a high pass filter and an adder circuit can be included to pass the high frequency portion of the first difference signal around the limiter. Alternatively, a deemphasizing circuit and a preemphasizing circuit can be respectively included in advance of, and following, the limiter.

8 Claims, 17 Drawing Figures

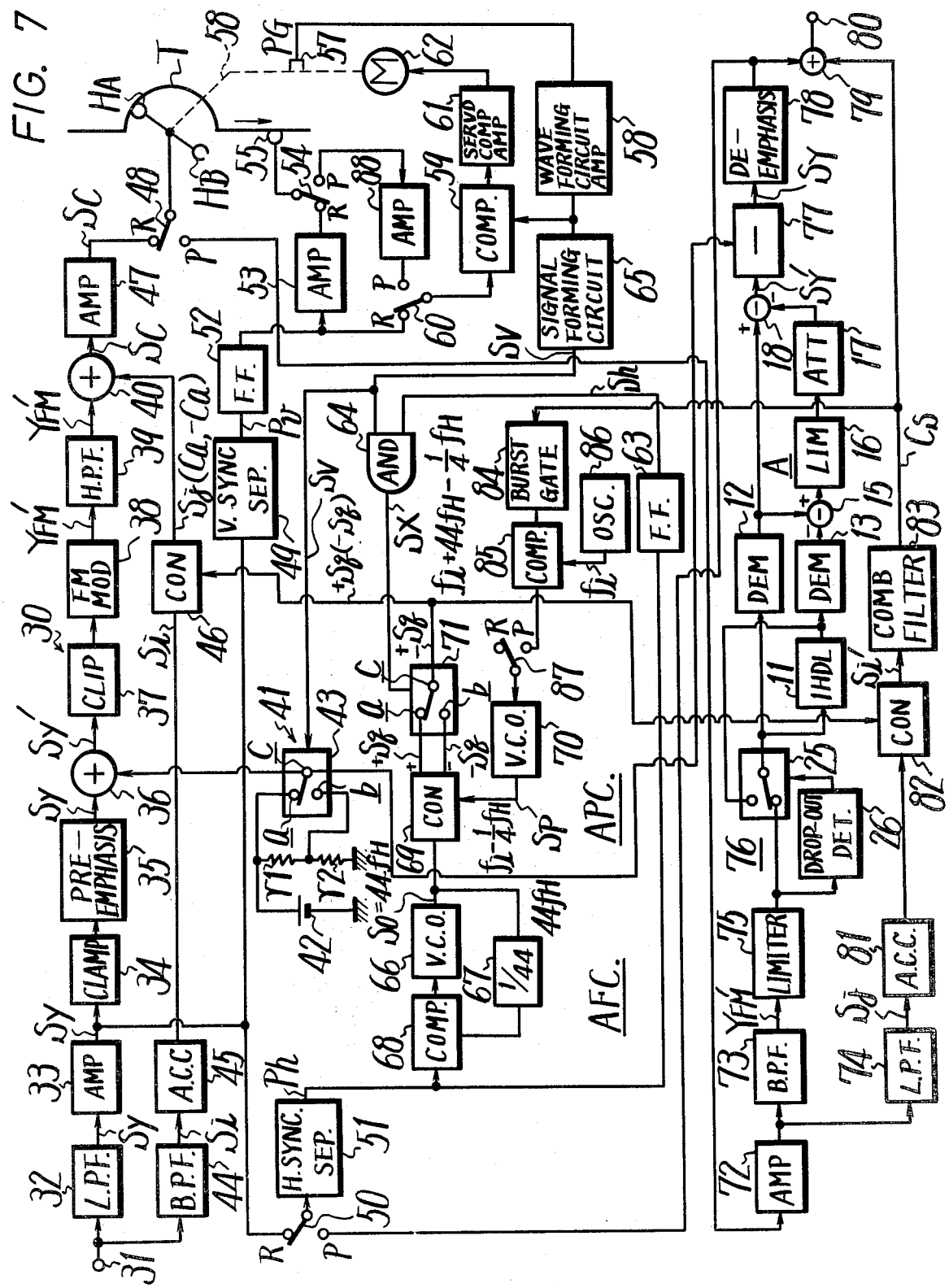

VIDEO SIGNAL PROCESSING CIRCUIT FOR ELIMINATING AN INTERFERING SIGNAL

BACKGROUND OF THE INVENTION

1. Field of the Invention

This invention relates to a video signal processing circuit, and in particular is directed to a circuit for eliminating a noise signal included in a video signal and for cancelling a cross-talk signal picked up from adjacent tracks when a a video signal is reproduced from a particular track of a recording medium.

2. Description of the Prior Art

In a typical video recording system, such as a video tape recorder (VTR), a video signal is recorded on a magnetic medium, such as magnetic tape, in successive, parallel, slanted tracks, each track generally having a field interval recorded therein and being formed of successive areas which correspond to respective line intervals of the video signal. If the video signal is a composite color television signal, recording is carried out by separating the chrominance and luminance components, frequency modulating the luminance component to a relatively higher band of frequencies, frequency converting the chrominance component to a band of frequencies which is lower than that contained in the frequency-modulated luminance signal, combining the frequency-modulated luminance signal, and frequency-converted chrominance signal and recording the combined signal in the same track. In order to avoid interference due to cross-talk during a signal reproduction operation, that is, to avoid interference due to signals which are picked up by a scanning transducer from an adjacent track when a given track is scanned, it has been the practice heretofore to provide guard bands to separate successive parallel tracks on the record medium. Such guard bands essentially are "empty" of information so as to avoid cross-talk pickup from such adjacent guard bands when a particular track is scanned.

However, the use of guard bands to separate successive tracks is a relatively inefficient usage of the record medium. That is, if the guard bands themselves could be provided with useful information, the overall recording density would be improved. Such improvement can be attained to some degree by providing two transducers for recording the combined luminance and chrominance signals, the two transducers having different azimuth angles. Hence, information is recorded in one track at one azimuth angle and information is recorded in the next adjacent track with a different azimuth angle. When the information in such tracks is reproduced by the same, respective transducers, the information recorded in the scanned track is reproduced with minimal attenuation, but because of azimuth loss, the cross-talk which is picked up from the next adjacent track is substantially attenuated. Since azimuth loss is proportional to the frequency of the recorded signals, it may be appreciated that the cross-talk due to the frequency-modulated luminance signals included in the recorded color television signals is attenuated far more than the cross-talk due to the frequency-converted chrominance signals. Also, since cross-talk attenuation due to azimuth loss is less effective as the width of the parallel tracks is reduced, it is not sufficient to rely solely on the use of transducers having different azimuth angles in order to reduce cross-talk noise when video signals are recorded in very narrow or overlapping tracks. If the cross-talk picked up from an adjacent track is not attenuated adequately, an interference or beat signal, having a frequency different from either the information signals which are recorded in the scanned track or the picked up (crosstalk signals which are recorded in an adjacent track, will appear as a beat or moire pattern in the video picture which ultimately is displayed.

Since reliance upon azimuth loss is not completely adequate for minimizing cross-talk interference cause by the frequency-converted chrominance signals which are picked up from an adjacent track, it has been proposed that such cross-talk can be reduced substantially by recording the frequency-converted chrominance signals in adjacent tracks with different carriers. For example, the phase of the frequency-converted chrominance carrier can be constant throughout successive line intervals in one track but will shift by 180° from line-to-line in the next adjacent track. As another example, the phase of the frequency-converted chrominance carrier in alternate line intervals in one track will differ by 180° (or $\pi$) from the phase of the frequency-converted chrominance carrier in adjacent alternate line intervals in an adjacent track, while all of the remaining line intervals in adjacent tracks will have frequency-converted chrominance carriers which are in phase with each other. Because or these phase characteristics in both examples, the cross-talk interference due to the frequency-converted chrominance signals which are picked up from an adjacent track will exhibit a frequency interleaved relationship with respect to the frequency-converted chrominance signals which are reproduced from the scanned track. Suitable filtering techniques can be used to eliminate those frequency components which correspond to the cross-talk interference.

While the use of different frequency-converted chrominace carriers is an effective technique for minimizing cross-talk interference attributed to the chrominance components, there still will be cross-talk interference due to the frequency-modulated luminance components, particularly if the record tracks exhibit minimal width. One proposed solution to this problem is to change frequency of the carrier for the frequency-modulated luminance component recorded in adjacent tracks. This is carried out by using two different bias voltages superposed onto the luminance component prior to frequency modulation thereof, which bias voltages effectively determine the frequency of a frequency-modulated carrier. As one example of this proposed solution, the frequencies of the carriers differ from each other by an odd multiple of one-half the horizontal synchronizing frequency. In a signal reproduction operation, the reproduced frequency-modulated luminance signal is demodulated, and the bias voltages which had been added to the original luminance component are removed therefrom, as by subtracting locally-generated bias voltages from the recovered luminance component. Even if the cross-talk interference picked up from adjacent tracks is included in the luminance component thus obtained, the cross-talk interference can be easily eliminated by a comb filter, because the frequency of the cross-talk interference is in a frequency-interleaved relationship with that of the reproduced luminance component.

FIG. 1 shows an embodiment of a previously comb filter which is used to cancel the cross-talk signal in the reproduced luminance component. In FIG. 1, the reproduced luminance component from an input terminal 10 is first applied to a frequency demodulator 12, and then through a delay line 11 having one horizontal interval to a frequency demodulator 13. The outputs from the demodulators 12 and 13 are additively combined with each other in an adder 14, so that the reproduced and demodulated luminance components are emphasized in level, while the cross-talk signals, which are phase-inverted from line to line, tend to cancel each other out. Hence, when the reproduced luminance components are displayed on a cathode ray tube, the cross-talk signal will not be perceived by a viewer.

However, the demodulated luminance components includes the noise signal due to the magnetic recording and reproducing, in addition to the cross-talk signal. Particularly, when the width of the record track becomes narrow, the noise level will be high because the signal-to-noise ratio of the reproduced luminance component will be greatly deteriorated.

Accordingly, an object of this invention is to provide a new video signal processing circuit which can eliminate and cancel an interfering signal, such as a noise signal or a cross-talk signal included in reproduced video signal.

According to an aspect of this invention, a video signal processing circuit for eliminating an interfering signal included in a video signal comprises a delay circuit for delaying the video signal for a predetermined number of horizontal line intervals to produce a delayed video signal; a first subtracting circuit for subtractively combining the video signal with the delayed video signal to produce a first difference signal representing the difference between the video signal and the delayed video signal; a limiter for limiting the first difference signal to produce a limiting difference signal; and a second subtracting circuit for subtractively combining the video signal with the limited difference signal to produce an output signal representing the difference between the video signal and the limited difference signal whereby the second subtracting circuit produces, as its output signal, the video signal free of the interfering signal. In order to further improve the performance of the video signal processing circuit, a high pass filter can be coupled to the first subtracting circuit to pass a high frequency portion of the first difference signal to an adding circuit to combine the limited first difference signal therewith. Alternatively, a deemphasis circuit and a preemphasis circuit can be included respectively in advance of, and following, the limiter.

Various other objects, features and advantages of this invention will be apparent from the following description taken in conjunction with the accompanying drawings.

BRIEF DESCRIPTION OF THE DRAWINGS

FIG. 7 is block diagram of video tape recorder wherein the circuit of this invention is utilized.

DESCRIPTION OF THE PREFERRED EMBODIMENT

Figure 1:
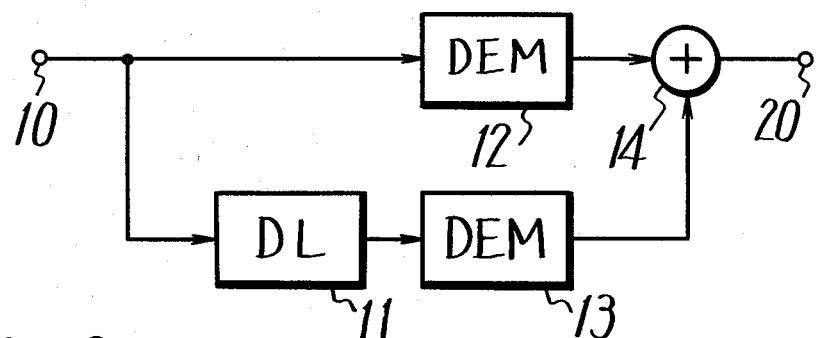
FIG. 1 shows a prior art video signal processing circuit which has been already explained.
Figure 2:
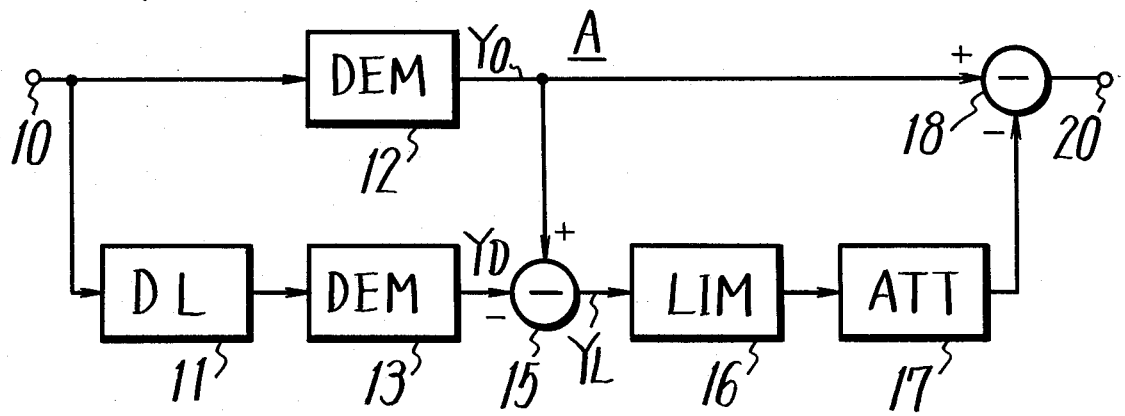
FIG. 2 is a block diagram of video signal processing circuit according to this invention.

FIG. 2 shows one embodiment of the processing circuit A of this invention, in which the frequency-modulated luminance component reproduced from the tape is supplied to the input terminal 10 of the circuit. The input terminal 10 is connected with the frequency demodulator 12 and is also coupled through the delay line 11, having delay of one horizontal line interval, with the frequency demodulator 13. The frequency demodulators 12 and 13 are respectively supplied with the luminance component and a delayed version of the luminance component to produce the demodulated luminance components $Y_O$ and $Y_D$. The demodulated luminance components $Y_O$ and $Y_D$ are subtractively combined with each other in a subtractor 15 in a fashion like that in which corresponding signals are additively combined in the circuit shown in FIG. 1. A difference signal $(Y_O-Y_H)$ is provided from the subtractor 15 to a limiter 16 to limit amplitude excursions thereof, the output $Y_L$ of which is further supplied through an attenuator 17 to a second subtractor 18. The demodulated signal $Y_O$ is directly supplied to the subtractor 18, and the signals $Y_L$ and $Y_O$ are subtractively combined with each other to produce the output signal $(Y_O-Y_L)$ at an output terminal 20 thereof.

The circuit shown in FIG. 2 operates in the following manner: when the content of the luminance component in any particular horizontal line interval is quite different from that in the preceding horizontal line interval, that is whenever there is little correlation between the luminance components in corresponding parts of consecutive horizontal intervals, the magnitude of the difference signal $(Y_O-Y_D)$ provided from the subtractor 15 becomes relatively large. Therefore, the difference signal $(Y_O-Y_D)$ is blocked by the limiter 16, so that the limiter 16 does not generate any output signal, and hence the output signal from the attenuator 17 is not fed to the subtractor 18. As a result, only the luminance component $Y_O$ from the demodulator 12 will appear at the output terminal 20.

However, in the case that there is relatively large correlation between the luminance components in the adjacent horizontal line intervals, the difference signal $(Y_O-Y_D)$ from the subtractor 15 becomes correspondingly small. Therefore, the difference signal $(Y_O-Y_D)$ passes through the limiter 16 and is supplied to the attenuator 17, in which the difference signal is attenuated to half of the amplitude of the signal, that is, to be $\frac{1}{2}(Y_O-Y_D)$. The attenuated signal $\frac{1}{2}(Y_O-Y_D)$ is combined with the demodulated luminance component $Y_O$ in the subtractor 18 to produce the following output signal.

$$Y_O-\tfrac{1}{2}(Y_O-Y_D)=\tfrac{1}{2}(Y_O+Y_D)$$

This means that if $Y_O \approx Y_D$, the luminance component appearing at the output terminal 20 has the same amplitude as that of the demodulated luminance component $Y_O$ and the luminance component eliminates any noise signal generated in the magnetic recording and reproducing system. This elimination of the noise signal occurs because the noise signal from the demodulator 12 is applied through the limiter 16 to the subtractor 18 without change and is subtracted from the luminance component $Y_O$ in the subtractor 18.

Nevertheless, it should be noted that the processing circuit A has a comb filter characteristic whenever there is a large correlation between the luminance components in adjacent horizontal line intervals. As hereinafter described in detail, the comb filter formed by the processing circuit A is used for eliminating cross-talk signals from adjacent tracks of recorded video information.

Figure 3A:
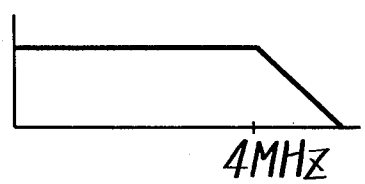
FIGS. 3A–3C are frequency response curves which are used for explanation of the circuit of FIG. 2.
Figure 3B:
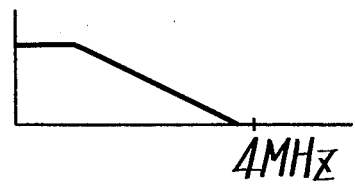

In the circuit of FIG. 2, however, the difference signal ($Y_O$–$Y_D$) provided from subtracting circuit 15 might not be exactly proportional to the true difference between the demodulated luminance components provided from the demodulators 12 and 13, because the delay line 11 does not have a sufficiently wide frequency band to pass the whole frequency band of the luminance component. That is to say, the demodulated luminance component $Y_O$ from the demodulator 12 has a relatively wide frequency response as shown in FIG. 3A, while the demodulated luminance component $Y_D$ from the demodulator 13 has a relatively narrow and limited frequency response, as shown in FIG. 3B, because of the narrow frequency pass band of the delay line 11. As a result, the difference signal $Y_L$ from the subtracting circuit 15 becomes large, even when a large correlation exists between the luminance components in the adjacent horizontal line intervals. The false difference signal $Y_L$ is limited and blocked by the limiter 16, and hence the noise signal included in the demodulated luminance component $Y_O$ is not completely cancelled or eliminated in the subtractor 18 and the processing circuit A itself does not have an optimum comb filter characteristic in that condition.

Figure 3C:
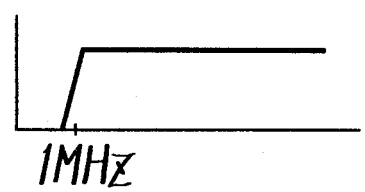
Figure 4:
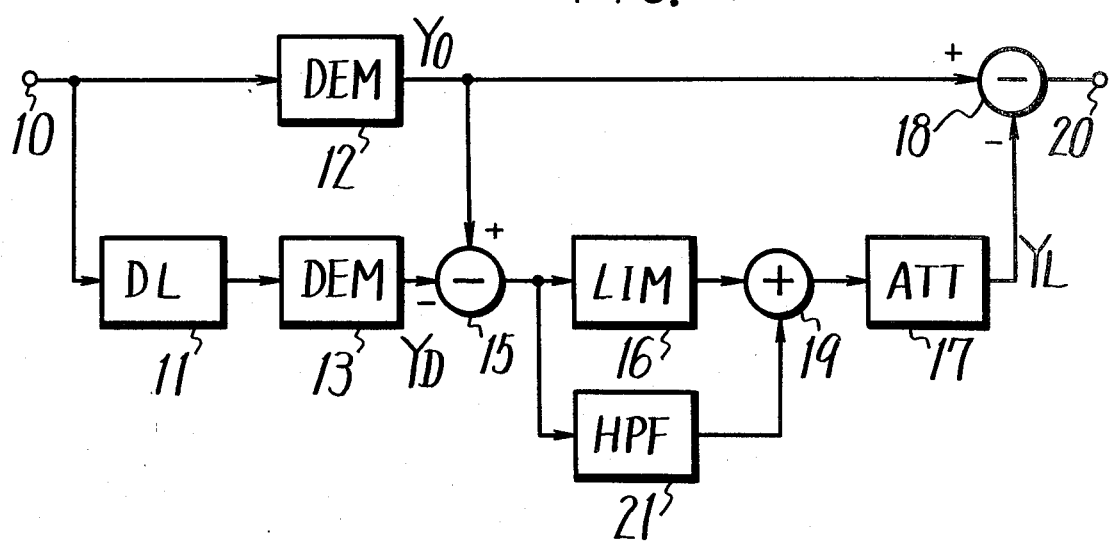
FIG. 4 is block diagram of another circuit according to this invention.

FIG. 4 shows another embodiment of the circuit according to this invention which avoids the above-described disadvantage. In the circuit of FIG. 4, the difference signal $Y_L$ from the subtracting circuit 15 is also supplied to a high pass filter 21 having a characteristic shown in FIG. 3C in addition to the limiter 16 and the output signals from the limiter 16 and the high pass filter 21 are additively combined with each other in an adder 19. The combined signal from the adder 19 is supplied through the attenuator 17 to the subtractor 18 in the same manner as in the embodiment shown in FIG. 2. Accordingly, when the correlation of the luminance components is high, the high frequency portion of the difference signal ($Y_O$–$Y_D$) is bypassed through the high pass filter 21, so that the processing circuit A can work more effectively as a noise canceller and comb filter for eliminating noise and cross-talk, respectively.

Figure 5A:
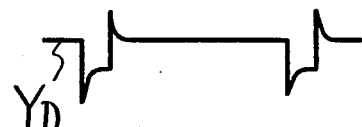
FIGS. 5A–5F are waveform diagrams for explanation of the circuit of FIG. 2.
Figure 5B:
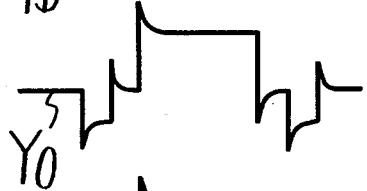
Figure 5C:
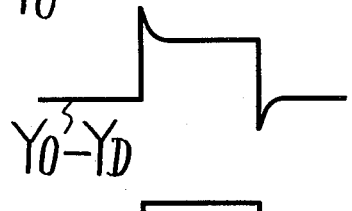
Figure 5D:
Figure 5E:
Figure 5F:
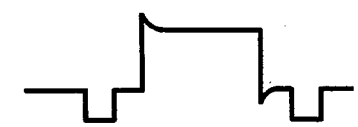

Further, the embodiment of FIG. 2 indicates the disadvantage that when the contents of the luminance signal change suddenly in consecutive horizontal intervals, for example from black level shown in FIG. 5A to white level shown in FIG. 5B, if the luminance signal is deemphasized in a deemphasis circuit following the subtractor 18, such signal will appear as shown in FIG. 5F, which causes smear noise to appear at the edge portion of the reproduced picture. This occurs because the limited difference signal ($Y_O$–$Y_D$) shown in FIG. 5D is a little integrated integrated somewhat in the attenuator 17 and the integrated signal shown in FIG. 5E is supplied to the subtractor 18.

Figure 6:
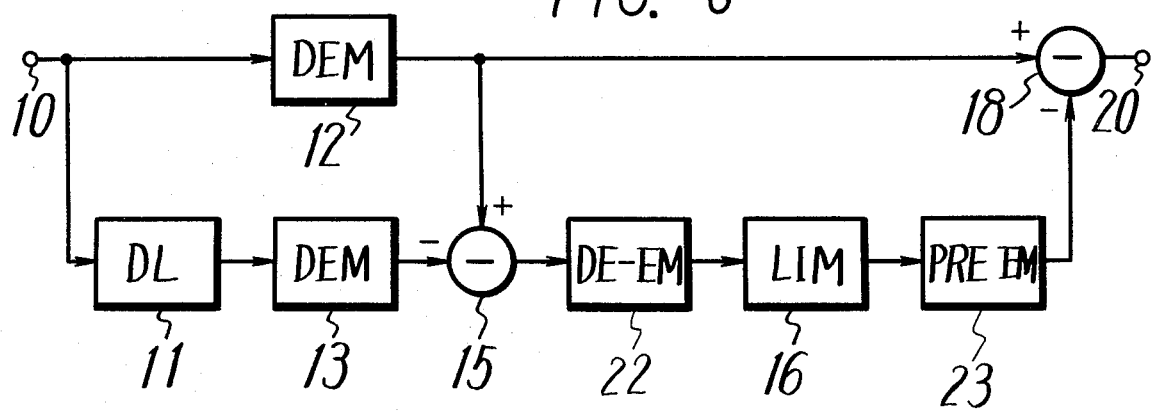
FIG. 6 is block diagram of a further circuit according to this invention.

FIG. 6 shows further another embodiment of this invention which overcomes the above-described defect. In the circuit of FIG. 6, the difference signal ($Y_O$–$Y_D$) is first applied to a de-emphasis circuit 22 which serves to eliminate the emphasized portion of the signal ($Y_O$–$Y_D$), and then the deemphasized difference signal is applied to the limiter 16 in the same manner as in the embodiment of FIG. 2. The output of the limiter 16 is applied to a preemphasis circuit 23 for reforming the signal shown in FIG. 5D, and the preemphasized signal from the circuit 23 is applied to the subtractor 18. It should be herein noted that only a small amount of emphasis is provided by the circuit 23, since the high frequency portion of the signal of FIG. 5C has only to be attenuated to a slight extent.

Referring now to FIG. 7, it will be seen that, in the recording section of an apparatus 30 according to this invention for recording and/or reproducing color video signals, an input terminal 31 is provided for receiving the color video signals which include luminance and chrominance components and are composed of line, field and frame intervals with blanking and synchronizing portions in each of those intervals. The color video signals are applied from input terminal 31 to a low pass filter 32 which transmits substantially only the luminance signal $S_Y$ to an automatic gain control amplifier 33. The gain controlled luminance component from amplifier 33 is applied to a clamp circuit 34 which clamps the luminance component to a fixed reference level in the usual way and supplies the clamped luminance component to a pre-emphasis circuit 35 in which the high frequency response of the luminance component is enhanced prior to being applied to an adding circuit 36. The output $S'_Y$ of adding circuit 36 is supplied to a clipping circuit 37 in which the overshooting and undershooting portions of the luminance component generated in pre-emphasis circuit 35 are eliminated or clipped. The clipped output of clipping circuit 37 is applied to a frequency modulator 38 for frequency modulating a suitably high frequency carrier in the latter. The frequency modulated luminance component $Y'_{FM}$ issuing from modulator 38 is passed through a high pass filter 39 to a mixing or adding circuit 40.

The carrier frequency of the frequency modulated luminance component $Y'_{FM}$ issuing from modulator 38 is shifted between first and second carrier frequencies which are in frequency interleaving relation to each other, and such shifting of the carrier frequency is controlled so that the frequency modulated luminance component, as recorded in tracks which are next adjacent to each other, has the first and second carrier frequencies, respectively.

More particularly, in the apparatus 30 illustrated on FIG. 7, shifting of the carrier frequency of the frequency modulated luminance component $Y'_{FM}$ is effected by selectively applying to adding circuit 36 different first and second bias voltages to be added to luminance component $S_Y$ for correspondingly changing the bias or voltage level of the luminance component $S'_Y$ which is supplied through clipping circuit 37 to frequency modulator 38. In the apparatus 30, a circuit 41 for selectively applying the different first and second bias voltages to adding circuit 36 is shown to include a DC voltage source in the form of a battery 42, a voltage divider constituted by a series connection of resistors $r_1$ and $r_2$ in parallel with battery 42, and a switching circuit 43. The switching circuit 43 is schematically represented as having two fixed contacts a and b respectively connected to a junction between resistor $r_1$ and battery 42 and to a junction between resistors $r_1$ and $r_2$, and a movable contact c which alternatively engages fixed contacts a and b and which is connected to an input of adding circuit 36. The switching circuit 43 is controlled by a control signal $S_V$ which is suitably generated, as hereinafter described in detail, so as to apply a first control voltage to switching circuit 43 for causing movable contact c to engage fixed contact a during the scanning of a track on tape T by head 12A, and to apply a different control voltage to switching circuit 43 for causing movable contact c of the latter to engage fixed contact b during scanning of a track by head 12B.

Since it is convenient to record one field of the color video signals in each track on tape T, the control signal $S_V$ desirably causes change-over of movable contact c of switching circuit 43 from one to the other of the fixed contacts a and b during each vertical blanking period of the video signals. It will be apparent that, during the engagement of movable contact c with fixed contact a, a relatively high bias voltage is applied through switching circuit 43 to adding circuit 36 so as to correspondingly offset the bias level of the luminance component $S_Y$ then being applied to the adding circuit. On the other hand, during engagement of movable contact c with fixed contact b, a relatively lower bias voltage is applied through switching circuit 43 to adding circuit 36 for providing a correspondingly smaller offset to the bias level of the luminance component. The difference between the bias voltage applied to adding circuit 36 during engagement of movable contact c with fixed contacts a and b, respectively, is determined, for example, by suitable selection of the values of resistors $r_1$ and $r_2$, so as to be effective, in the frequency modulator 38, to establish the desired difference $(m+\frac{1}{2})f_H$ between the first and second carrier frequencies with which the frequency modulated luminance component $Y'_{FM}$ is recorded in alternating tracks on the tape T by the heads $H_A$ and $H_B$, respectively.

The color video signals applied to input terminal 31 are also supplied from the latter to a band pass filter 44 which separates the chrominance component $S_i$ from the color video signals and passes the chrominance component through an automatic color control circuit 45 to a frequency converter 46 in which the chrominance component is converted to a frequency band lower than that of the frequency modulated luminance component $Y'_{FM}$ supplied to mixing circuit 40. The resulting frequency converted chrominance component $S_j$ is supplied from frequency converter 46 to another input of mixing circuit 40 so as to be combined, in the latter, with the frequency modulated luminance component $Y'_{FM}$ for providing a composite signal $S_c$ which is supplied through a recording amplifier 47 and a record terminal R of a record-playback switch 48 to the rotary heads $H_A$ and $H_B$.

The luminance component $S_Y$ from automatic gain control circuit 33 is also shown to be supplied to a vertical sync separator 49 and, through a record terminal R of a recordplayback switch 50, to a horizontal synch separator 51, so that separators 49 and 51 respectively separate vertical synchronizing signals $P_v$ and horizontal synchronizing signals $P_h$ from the luminance component. The separated vertical synchronizing signals $P_v$ are applied from separator 49 to a divider 52 which may be in the form of a flip-flop, as shown, and which is operative to provide control signals at a repetition rate which is a predetermined fraction ($\frac{1}{2}\times n$) of the repetition rate of the separated vertical synchronizing signals, in which n is the number of field intervals to be recorded in each of the tracks. In the case where one field interval is recorded in each of the tracks, the repetition rate of the control signals issuing from divider 52 is one-half the repetition rate of the vertical synchronizing signals, and the divider 52 may be constituted by a flip-flop, as shown. In any case, it will be appreciated that the control signals issuing from divider or flip-flop 52 occur in correspondence with the recording of color video signals in alternating or every other one of the tracks so as to identify or distinguish between the tracks in which the frequency modulated luminance component is recorded with first and second carrier frequencies and the chrominance component is recorded with first and second carriers, as hereinafter described in detail. The control signals from divider or flip-flop 52 are applied through an amplifier 53 and a record terminal R of a record-playback switch 54 to a fixed transducer or head 55 which is disposed adjacent a longitudinal edge portion of tape T for recording the control signals at suitably spaced apart locations along such longitudinal edge portion.

The control signals from divider or flip-flop 52 are also employed in a servo-system for regulating the movements of heads $H_A$ and $H_B$ relative to tape T. As shown, such servosystem may comprise pulse generating means 57 for producing pulse signals PG upon the operative positioning of one of the heads $H_A$ and $H_B$ relating to tape T, for example, generating means 57 may produce a pulse signal PG each time head $H_A$ begins to scan a respective track on the tape. The pulse generating means 57 may conventionally include a magnet fixed on a drive shaft 58 by which the heads $H_A$ and $H_B$ are rotated, and a transducer or coil suitably located along the circular path of movement of such magnet so that, as head $H_A$ commences to move along a track on tape T, the magnet on shaft 58 passes near the coil of pulse generating means 57 and causes the latter to emit a pulse signal. The successive pulse signals from pulse generating means 57 are applied through a wave forming circuit 58 to a phase comparator 59 which also receives the control signals from divider or flip-flop 52 through a record terminal R of a record-playback switch 60. The comparator 59 compares the phases of the control signals from flip-flop 52 and of the pulse signals from generating means 57 and provides a corresponding brake control or servo signal which is passed through a servo amplifier 61 for either suitably decreasing or increasing the speed at which heads $H_A$ and $H_B$ are driven by a motor 62 connected with shaft 58 so that heads $H_A$ and $H_B$ will commence to move along respective tracks on tape T at the commencement of alternating field intervals of the color video signals being recorded.

The separated horizontal synchronizing signals $P_h$ are applied from separator 51 to a flip-flop 63 which produces a control signal $S_h$ applied to one input of an AND gate or circuit 64. The output of wave forming circuit 58 is also applied to a signal forming circuit 65 which produces the previously mentioned control signal $S_v$ applied to a signal forming circuit 65 which produces the previously mentioned control signal $S_v$ applied to switching circuit 43 and also applied to a second input of AND circuit 64.

Figure 8A:
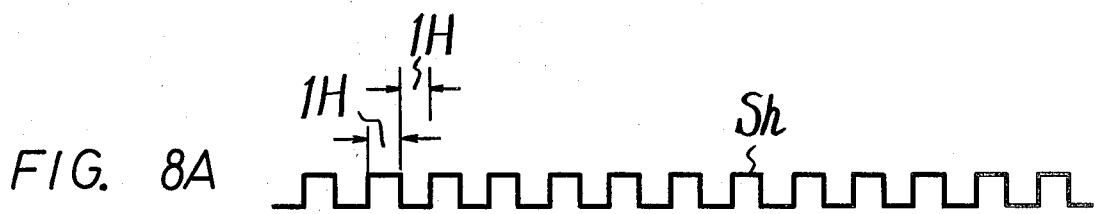
FIGS. 8A–8C are waveform diagrams for explanation of the circuit of FIG. 7.
Figure 8B:
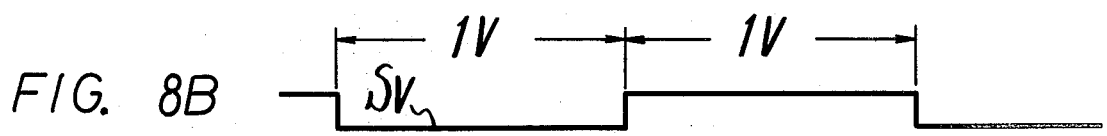
Figure 8C:
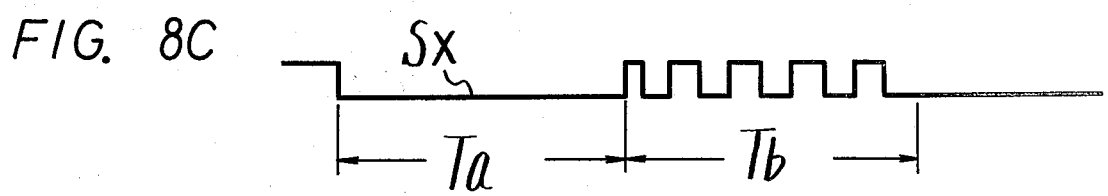

Since the output or control signal $S_h$ from flip-flop 63 is shown at A on FIG. 8 to be a square wave having high and low intervals each equal to one line interval H, and the output or control signal $S_v$ from signal forming circuit 65 is shown at B on FIG. 8 to be a square wave having high and low intervals each equal to one field interval V, the output or control signal $S_x$ from AND circuit 64 remains low during one entire field interval $T_a$ and goes high only during alternate line intervals of the alternate field interval $T_b$, as shown at C on FIG. 8. In the illustrated recording and/or reproducing apparatus 30, such output or control signal $S_x$ from AND circuit 64 is employed for controlling the establishment of different carriers for the frequency converted chrominance component $S_j$ to be recorded in tracks that are next adjacent to each other, with such carriers differing from each other in their polarity characteristics as described in detail in U.S. Pat. Nos. 3,925,810, 4,007,482 and 4,007,484.

In the illustrated apparatus 30, the circuit for frequency converting the chrominance component $S_i$ and for providing the different carriers with which the frequency converted chrominance component $S_j$ is recorded in tracks that are next adjacent each other is shown to include a voltage controlled oscillator 66 providing an output $S_o$ with a center frequency of, for example 44 $f_H$. The output $S_o$ of oscillator 66 is applied to a divider 67 to be divided in the latter by 44, and the output of divider 67 is applied to a comparator 68 which also receives the separated horizontal synchronizing signals $P_h$ from separator 51. It will be appreciated that comparator 68 compares the frequency of the output from divider 67 with the frequency $f_H$ of the separated horizontal synchronizing signals $P_h$ and, upon any deviation therebetween, provides a suitable control voltage to voltage controlled oscillator 66 so that the frequency of the output $S_o$ is automatically controlled or maintained at $44 \times f_H$. The output $S_o$ of oscillator 66 is applied to a frequency converter 69 which may be in the form of a balanced modulator, and in which the output $S_o$ is frequency converted by a frequency converting signal $S_p$ from a voltage controlled oscillator 70 having a center frequency of $f_i - \frac{1}{4} f_H$ in which $f_i$ is the original or standard carrier frequency of the chrominance component $S_i$ of the color video signals being recorded. The balanced modulator or frequency converter 69 has two outputs + and − of opposite polarity at which frequency converting signals $+S_q$ and $-S_q$, respectively, appear. Such frequency converting signals $+S_q$ and $-S_q$ are of opposite phase or polarity and have the frequency $(f_i + 44 f_H - \frac{1}{4} f_H)$.

The frequency converting signals $+S_q$ and $-S_q$ are alternatively applied to frequency converter 46 through a switching circuit 71 which is schematically represented as having fixed contact a and b respectively connected to the + and − outputs of balanced modulator 69 and a movable contact c which is alternately engageable with the fixed contact a and b and connected to frequency converter 46. Switching circuit 71 is controlled by the control signal $S_x$ from AND circuit 64 so that movable contact c of switching circuit 71 engages fixed contact a for applying frequency converting signal $+S_q$ to converter 46 whenever control signal $S_x$ has a low value, and for engaging movable contact c with fixed contact b and thereby applying frequency converting signal $-S_q$ to converter 46 whenever control signal $S_x$ has a high value. Frequency converting signals $+S_q$ and $-S_q$ alternately applied to frequency converter 46 are effective in the latter to convert the carrier of the chrominance component from its original carrier frequency $f_i$ to a relatively lower carrier frequency $f_c = 44 f_H - \frac{1}{4} f_H$. As a result of the foregoing, the frequency converted chrominance component $S_j$ applied from frequency converter 46 to mixing circuit 40 has a frequency band lower than that of the frequency modulated luminance component $Y'_{FM}$. Further, during intervals when the frequency converting signal $-S_q$ is applied to frequency converter 46, the polarity or phase of the carrier of the frequency converted chrominance component $S_j$ is reversed as compared with the phase or polarity of such carrier during the intervals when the frequency converting signal $+S_q$ is applied to frequency converter 46.

It will also be noted that the carrier frequency $f_c$ of the frequency converted chrominance component $S_j$ satisfies the equation $$f_c = \frac{1}{4} f_H (2m-1)$$

in which m is a whole positive integer. Of course, in the present case, in which $f_c = 44 f_H - \frac{1}{4} f_H$, the value for m in the above equation is 88. As a result of the described selection of the carrier frequency of the frequency converted chrominance component $S_j$, the second harmonic of the carrier of the frequency converted chrominance component is interleaved with the luminance component so as to avoid beat interference therebetween. By avoiding such beat interference, the frequency converted chrominance component can be recorded with a relatively high amplitude in respect to the amplitude of the frequency modulated luminance component for obtaining a good signal-to-noise ratio of the chrominance component, as described in detail in U.S. Pat. No. 3,730,983, having a common assignee herewith. In any event, the frequency converted chrominance component $S_j$ and the frequency modulated luminance component $Y'_{FM}$ are combined in mixing circuit 40 with the frequency converted chrominance component $S_j$ amplitude modulating the frequency modulated luminance component $Y'_{FM}$ to provide the combined or composite signal $S_c$ which is applied through amplifier 47 and record-playback switch 48, in the record position of the latter, to heads $H_A$ and $H_B$ for recording by the latter in the successive parallel tracks on tape T.

The switches 48, 50, 54 and 60 are ganged or interconnected so as to be simultaneously changed-over from their recording positions shown on FIG. 7 to their reproducing or playback positions in which the movable contact of each of the enumerated switches engages a respective playback terminal or contact P. In the reproducing or playback section of apparatus 30, the playback terminal P of switch 48 is connected to a reproducing amplifier 72 so as to apply to the latter the signals being alternately reproduced by heads $H_A$ and $H_B$ from the successive parallel tracks on tape T. The output of reproducing amplifier 72 is connected to a band pass filter 73 and a low pass filter 74 which respectively separate the frequency modulated luminance component $Y'_{FM}$ and the frequency converted chrominance component $S_j$ from the reproduced signals. The frequency modulated luminance component $Y'_{FM}$ separated from the reproduced signals is passed through a limiter 75 to a drop-out compensator 76 so as to compensate the drop-out contained in the reproduced luminance component. The drop-out compensator 76 is composed of a switch circuit 25, a drop-out detector 26 which detects the drop-out in the luminance component and generates a control signal for the switch circuit 25, and one horizontal interval delay line 11 which is used in common as the delay line in the processing circuit according to the invention. The frequency modulated luminance component $Y'_{FM}$ is applied to one of the fixed terminal of the switch 25, the movable terminal of which is connected with the video signal processing circuit A shown in FIG. 2. It is noted that the output of the delay line 11 is connected with another of fixed terminal of the switch 25. The movable terminal of the switch 25 is usually connected with the output of the limiter 75, while the former terminal is switched over to the output of the delay line 11 when the detector 26 detects the drop-out in the luminance component. As a result of the switching operation, the luminance component in the preceding horizontal line interval containing no drop-out is supplied to the processing circuit A which operates in the above-described manner so as to obtain the demodulated luminance component $S'_Y$. It will be noted that the demodulated luminance components $S'_Y$ will have changes in the level thereof corresponding to the different carrier frequencies with which the frequency modulated luminance component $Y'_{FM}$ was recorded in the next adjacent tracks on tape T. In order to eliminate such changes in level of the demodulated luminance component $S'_Y$, the latter is applied to a subtracting circuit 77 which is also connected to the output of switching circuit 43 so as to alternately receive from the latter the previously described different first and second bias voltages. Such different first and second bias voltages are alternately subtracted from the demodulated luminance component $S'_Y$ in subtracting circuit 77 so as to obtain the reproduced luminance component $S_Y$ which is applied through a de-emphasis circuit 78 to a mixing or adding circuit 79 having its output connected to an output terminal 80.

The frequency converted chrominance component $S_j$ separated from the reproduced signals by filter 74 is applied through an automatic color control circuit 81 to a frequency reconverter 82 which alternately receives the frequency converting signals $+S_q$ and $-S_q$ from switching circuit 71, and by which the carrier of the reproduced chrominance component $S_j$ is reconverted to the original carrier frequency $f_i$. The resulting frequency reconverted chrominance component $S'_i$ is passed through a comb filter 83 in which, as hereinafter described in detail, chrominance components of crosstalk signals are cancelled or suppressed so that only the chrominance component $C_s$ of the video signals being reproduced from a particular track by the head $H_A$ or $H_B$ is passed to mixing circuit 79 for combining in the latter with the luminance component $S_y$ from de-emphasis circuit 78 and thereby forming the desired reproduced video signals applied to output terminal 80.

The output of comb filter 83 is also shown to be connected to a burst gate 84 which extracts burst signals from the reconverted chrominance signal component $S'_i$ and applies the extracted burst signals to one input of a phase comparator 85. As oscillator 86 provides an output at the standard or original carrier frequency $f_i$ for the chrominance component, and such output is applied to a second input of comparator circuit 85.

The output of phase comparator 85 is connected to a playback terminal P of a switch 87 which is also ganged or interconnected with the switches 48, 50, 54 and 60 so as to be effective, in the playback or reproducing mode of operation of apparatus 30, to apply the output of phase comparator 85, as a control voltage, to voltage controlled oscillator 70. It will be apparent that, in the reproducing mode of operation, any phase difference between the burst signals extracted by gate 84 from the reconverted chrominance component and the output of oscillator 86 causes comparator 85 to apply a suitable control voltage to voltage controlled oscillator 70 for effecting a required change in the phase of the converting signals $+S_q$ and $-S_q$, whereby to achieve an automatic phase control function for eliminating so-called jitter from a picture or image produced on a cathode ray tube in response to video signals obtained at output terminal 80.

In the reproducing mode of operation of apparatus 30, control signal $S_x$ for operating switching circuit 71 is again obtained from AND circuit 64 in response to the control signals $S_v$ and $S_h$ from signal forming circuit 65 and flip-flop 63, respectively. As before, the signal forming circuit 65 responds to the output of wave forming circuit 58 which, in turn, is responsive to the pulse signals PG from pulse generating means 57. However, in the reproducing or playback mode of operation of apparatus 30, the fixed head 55 reproduces the recorded control signals 56. The control signals reproduced by head 55 are applied through playback terminal P of switch 54 to an amplifier 88, and the output of the latter is applied through playback terminal P of switch 60 to comparator 59. Thus, comparator 59 compares the phase of the reproduced control signals 56 with the output of wave forming circuit 58 so as to provide a suitable servo control signal which is applied through servo amplifier 61 for controlling the rotation of heads $H_A$ and $H_B$ by motor 62. It will be apparent that the described servo control arrangement is effective, in the reproducing mode of operation, to ensure that each of the tracks on tape T will be scanned by the same head $H_A$ or $H_B$ which was employed for recording video signals in such track, and further to ensure that the control signal $S_v$ applied to AND circuit 64 will have the same relationship to the reproduced video signals as it had to the recorded video signals. In other words, if control signal $S_v$ has its low and high values during the recording of video signals by heads $H_A$ and $H_B$, respectively, control signal $S_V$ will similarly has its low and high values during the reproducing of the signals by heads $H_A$ and $H_B$, respectively. Further, it will be seen that the playback terminal of switch 50 is connected to the output of deemphasis circuit 78 so that, in the reproducing mode of operation, horizontal synch separator 51 will separate horizontal synchronizing signals from the reproduced luminance component $S_Y$ for controlling oscillator 66 and flip-flop 63.

The above described recording and/or reproducing apparatus 30 operates as follows:

RECORDING MODE OF OPERATION

In the recording mode of operation of apparatus 30, each of switches 48, 50, 54, 60, and 87 is in its recording position so as to engage the respective recording terminal R, as shown shown on FIG. 7. In the recording operation of apparatus 30, the output of flip-flop 52 triggered by vertical synchronizing signals $P_V$ separated from the luminance component $S_Y$ of the color video signals applied to input terminal 31 is compared, in phase comparator 59, with the output of wave forming circuit 58 triggered by pulse signals PG from pulse generating means 57 so as to provide a suitable servo control signal by which the rotary movements of heads $H_A$ and $H_B$ are controlled to ensure that such heads $H_A$ and $H_B$ commence the scanning of alternating tracks on tape T at the commencement of respective field intervals of the color video signals.

During recording, the operation of switching circuit 43 is controlled by control signal $S_V$ from signal forming circuit 65 which is responsive to the output of wave forming circuit 58 so that circuit 41 applies different first and second bias voltages to adding circuit 36 during the field intervals of the incoming color video signals which are to be respectively recorded by the heads $H_A$ and $H_B$. As previously mentioned, such first and second bias voltages, when added in adding circuit 36 to the chrominance component $S_Y$ separated from the incoming color video signals, are effective in frequency modulator 38 to establish the desired difference $(m+\frac{1}{2}) f_H$ between the carrier frequencies with which the resulting frequency modulated luminance component $Y'_{FM}$ is recorded in alternating tracks on the tape T by the heads $H_A$ and $H_B$, respectively. In other words, the frequency modulated luminance component $Y'_{FM}$ of the composite or combined signal $S_c$, as recorded by heads $H_A$ and $H_B$ in tracks which are next adjacent to each other on tape T have different carrier frequencies which are in frequency interleaving relation to each other.

Further, during recording, the chrominance component $S_i$ separated from the incoming color video signals and having the original or standard carrier frequency $f_i$, is acted upon in frequency converter 46 by the frequency converting signal $+S_q$ or $-S_q$ so as to provide the frequency converted chrominance component $S_j$ with the reduced carrier frequency $f_c = 44 f_H - \frac{1}{4} f_H$. Thus, the frequency band of the frequency converted chrominance component $S_j$ is lower than that of the frequency modulated luminance component $Y_{FM}$ with which it is combined in mixing circuit 40 to constitute the composite or combined signal $S_c$ alternately recorded by heads $H_A$ and $H_B$ in the successive tracks on tape T. The alternative application of frequency converting signals $+S_q$ and $-S_q$ to frequency converter 46 is determined by switching circuit 71 which is, in turn, controlled by the control signal $S_X$ from AND circuit 64. Since frequency converting signals $+S_q$ and $-S_q$ are of opposite phase or polarity, the effect thereof in frequency converter 46 will be to provide the resulting frequency converted chrominance component $S_j$ with respective carriers $C_a$ and $-C_a$ which are similarly of opposite phase or polarity. As is apparent from waveform C on FIG. 8, control signal $S_X$ remains low during one entire field interval $T_a$, and goes high only during alternate line intervals of the alternate field interval $T_b$, for example, each field interval recorded by the head $H_B$. Thus, during each field interval recorded by head $H_A$, frequency converting signal $+S_q$ is continuously applied to frequency converter 46 with the result that the successive line intervals of each field intervals recorded by head $H_A$ are provided with a carrier of the same polarity. On the other hand, during successive line intervals of each field interval recorded by head $H_B$, frequency converting signals $+S_q$ and $-S_q$ are alternately applied to frequency converter 46 so that the successive line intervals of each field interval recorded by head $H_B$ are alternately recorded with the carriers $C_a$ and $-C_a$ of opposed polarity.

REPRODUCING MODE OF OPERATION

In the reproducing mode of operation of apparatus 30, switches 48, 50, 54, 60, and 87 are changed over to engage their respective reproducing or playback terminal, P, with the result that the signals reproduced alternately by the head $H_A$ and $H_B$ from the successive tracks on tape T are applied through switch 48 and reproducing amplifier 72 to filters 73 and 74 which respectively separate the frequency modulated luminance component $Y'_{FM}$ and the frequency converted chrominance component $S_j$ from the reproduced signals. In the reproducing or playback operation of apparatus 30, the rotation of heads $H_A$ and $H_B$ is regulated, on the basis of a comparison of the control signals 56 reproduced from the tape T by fixed head 55 with the pulse signals PG from pulse generating means 57, so that the signals recorded in respective tracks of tape T by heads $H_A$ and $H_B$ will be reproduced by such heads $H_A$ and $H_B$, respectively. Further, as a result of such servo control of the rotation of heads $H_A$ and $H_B$, the control signals $S_v$ from signal forming circuit 65 for controlling switching circuit 43 and the control signals $S_X$ from AND circuit 64 for controlling switching circuit 71 have the same relationships to the operative positioning of the heads $H_A$ and $H_B$ during the reproducing operation as during the recording operation.

In respect to the frequency modulated luminance component $Y'_{FM}$ separated from the reproduced signals, such luminance component is applied to the processing circuit A according to this invention which is described in detail above, and the noise-eliminated and demodulated luminance component will be obtained therefrom. The demodulated luminance component $S'_Y$ will have changes in the level thereof corresponding to the different carrier frequencies with which the frequency modulated luminance component $Y'_{FM}$ was recorded in the next adjacent tracks on tape T. However, by reason of the control of switching circuit 43 by control signal $S_v$, the different bias voltages subtracted from luminance component $S'_Y$ in subtracting circuit 77 are suitably selected so as to eliminate such changes in level and provide the desired reproduced luminance component $S_Y$ applied through deemphasis circuit 78 to mixing circuit 79. During the reproducing operation, cross-talk or interference in respect to the luminance component of the video signals is eliminated partly by reason of the different azimuth angles with which the air gaps of heads $H_A$ and $H_B$ are preferably provided, and also by reason of the fact that the frequency modulated luminance component is recorded with different carrier frequencies in the adjacent tracks. Thus, as previously described, in the event that each of the tracks on tape T has a small width for increasing the recording density, in which case the azimuth loss is not sufficient to prevent cross-talk in respect to the frequency modulated luminance component recorded in adjacent tracks, the reproducing head $H_A$ will pick up the signals recorded in that track and also, to some extent, the signals recorded in the next adjacent track. However, the frequency modulated luminance component reproduced by head $H_A$ from an adjacent track, that is, the cross-talk luminance component, will have a carrier frequency that differs by $(m+\frac{1}{2})f_H$ from the carrier frequency of the frequency modulated luminance component being simultaneously reproduced from main track being scanned by head $H_A$. Thus, the frequency of the cross-talk luminance component is in frequency interleaving relation to the frequency of the main reproduced luminance component.

As a result of the foregoing, when the frequency modulated luminance component is respectively demodulated in frequency demodulators 12 and 13, the demodulated luminance component $S_Y$ will include the desired luminance component and also an interfering or cross-talk signal having the frequency $(m+\frac{1}{2})f_H$ with the result that the cross-talk signal will be inverted in phase in successive horizontal line intervals of the video signals. As previously described herein, when a high correlation exists between the reproduced luminance components in successive horizontal line intervals, the processing circuit A constitues the comb filter as a whole, so that the cross-talk signals having the carrier frequency $(m+\frac{1}{2})f_H$ are cancelled therein, and will not appear as a conspicuous noise or beat on the displayed image.

Considering the frequency converted chrominance component, it should be noted that the effect of providing the same with carriers $C_a$, $-C_a$ of reversed phase or polarity in successive line intervals or areas of each track recorded by head $H_B$ is to provide a new carrier $C_b$ having frequency components offset by $\frac{1}{2} f_H$ with respect to the frequency components of the carrier $C_a$ with which the frequency converted chrominance component is recorded in the next adjacent tracks by head $H_A$ so as to interleave therewith, as described in detail in U.S. Pat. No. 3,925,810.

Accordingly, in the reproducing operation of apparatus 30, when head $H_A$ reproduces the frequency converted chrominance component recorded therein with the carrier $C_a$, the undesired or cross-talk signals simultaneously reproduced by head $H_A$ from the next adjacent track has its frequency converted chrominance component provided with a carrier in frequency interleaving relation to the carrier $C_a$. Similarly, when head $H_B$ reproduces the frequency converted chrominance component recorded therein with the carrier $C_b$, the undesired or cross-talk signal simultaneously reproduced by head $H_B$ from the next adjacent track has its frequency converted chrominance component provided with a carrier in frequency interleaving relation to the carrier $C_b$.

During the reproducing operation of apparatus 30, switching circuit 71 is again controlled by control signal $S_x$ from AND circuit 64 so that frequency reconverter 82 continuously receives the frequency converting signal $+S_q$ during the scanning of a track by head $H_A$, and so that frequency converting signals $+S_q$ and $-S_q$ are alternately applied to frequency reconverter 82 for successive line intervals during the scanning of a track by head $H_B$. As a result of the foregoing, during the scanning of a track by head $H_A$, frequency reconverter 82 reconverts the carrier $C_a$ of the chrominance component to a carrier $C_s$ having the original or standard carrier frequency $f_i$, while the carrier $C'_b$ of the cross-talk chrominance component has its frequency similarly shifted so as to be spaced midway between the principal side bands of the desired carrier $C_s$. Similarly, during the scanning of a track by head $H_B$, frequency reconverter 82 frequency converts the carrier $C_b$ of the chrominance component to a carrier $C_s$ also having the original or standard frequency $f_i$, while the carrier $C'_a$ of the cross-talk chrominance component has its frequency similarly shifted so as to be spaced midway between the principal side bands of the desired carrier $C_s$. Thus, the reconverted carrier $C_s$ of the chrominance component reproduced during alternate field intervals both have the same carrier frequency $f_i$, while the chrominance component of the undesired or cross-talk signal is, in each case, spaced midway between the principal side bands of the desired carrier and can be eliminated by the comb filter 83 to yield the desired reconverted chrominance component $C_s$ which is free of any cross-talk chrominance component.

It will be apparent from the above, that, in the described recording and/or reproducing apparatus 30 according to this invention, the reproduced color video signals obtained at output terminal 80 contain luminance and chrominance components that are both free of cross-talk even though the signals have been recorded without guard bands between successive parallel tracks on the tape T and even though such tracks have been recorded to be quite narrow so as to attain a high recording density.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope or spirit of the invention as defined in the appended claims.

What is claimed is:

1. A video signal processing circuit for eliminating an interfering signal included in a video signal that is reproduced, from a recorded video signal recorded in successive parallel tracks on a record medium, by a transducer which scans one of said successive tracks, said interfering signal including crosstalk signals reproduced by said transducer from a track next adjacent the track being scanned, and said video signal comprising a frequency modulated luminance component whose carrier frequency varies by an amount $\frac{1}{2}(2m+1)f_H$ from the carrier frequency of the luminance component in the crosstalk signals reproduced from said track next adjacent the track being scanned, where m is an integer and $f_H$ is the horizontal line frequency, said circuit comprising:

first frequency demodulating means for frequency demodulating said luminance component and providing a demodulated luminance component;

delaying means for delaying said reproduced video signal for a predetermined number of horizontal line intervals to produce a delayed video signal;

second frequency demodulating means for frequency demodulating the luminance component in said delayed video signal and providing a demodulated delayed luminance component;

first combining means for combining said demodulated luminance component with said demodulated delayed luminance component, said first combining means producing a first difference signal representing the difference between said demodulated luminance component and said demodulated delayed luminance component;

means for limiting said first diffference signal to produce a limited difference signal;

high pass filter means coupled to said first combining means to pass a high frequency portion of said first difference signal;

second combining means for additively combining said high frequency portion with said limited difference signal to provide a combined signal; and third combining means for combining said demodulated luminance signal with said combined signal to produce an output signal representing the difference between said demodulated luminance signal and said combined signal, whereby said third combining means produces said output signal free of said interfering signal.

2. A video signal processing circuit for eliminating an interfering signal included in a video signal, said circuit comprising:

delaying means for delaying said video signal for a predetermined number of horizontal line intervals to produce a delayed video signal;

first combining means for combining said video signal with said delayed video signal, said first combining means producing a first difference signal representing the difference between said video signal and said delayed video signal;

means for limiting amplitude excursions of said first difference signal to produce a limited difference signal; and second combining means for combining said video signal with said limited difference signal to produce an output signal representing the difference between said video signal and said limited difference signal, whereby said second combining means produces said output signal free of said interfering signal.

3. A video signal processing circuit according to claim 2, further comprising drop-out detecting means for detecting drop-out in said video signal, and drop-out compensating means including switching means controlled by said drop-out detecting means such that said delayed video signal from said delaying means is fed back, as said video signal, to said second combining means and to said delaying means whenever drop-out is detected.

4. A video signal processing circuit according to claim 2, further comprising attenuating means for attenuating said limited difference signal.

5. A video signal processing circuit according to claim 4, wherein said attenuating means attenuates to one-half the amplitude of said limited difference signal.

6. A video signal processing circuit according to claim 2, in which said video signal is reproduced, from a recorded video signal recorded in successive parallel tracks on a record medium, by a transducer which scans one of said successive tracks, said interfering signal includes crosstalk signals reproduced by said transducer from a track next adjacent the track being scanned, and said video signal comprises a frequency modulated luminance component whose carrier frequency varies by an amount $\frac{1}{2}(2m+1)f_H$ from the carrier frequency of the luminance component in the crosstalk signals reproduced from said track next adjacent the track being scanned, where m is an integer and $f_H$ is the horizontal line frequency.

7. A video signal processing circuit according to claim 6, further comprising:

a first frequency demodulating means for frequency demodulating said luminance component and applying the demodulated luminance component to said first and second combining means; and second frequency demodulating means for frequency demodulating the luminance component in said delayed video signal and applying the demodulated delayed luminance component to said fist combining means.

8. A video signal processing circuit according to claim 7, further comprising:

deemphasizing means coupled to said first combining means for deemphasizing said first difference signal and supplying a deemphasized first difference signal to said limiting means; and preemphasizing means coupled to said limiting means for preemphasizing said limited difference signal and supplying a preemphasized limited difference signal to said second combining means.

* * * * *